United States Patent
Shevchenko et al.

(10) Patent No.: US 10,260,533 B2
(45) Date of Patent: *Apr. 16, 2019

(54) PNEUMATIC INSECT ROBOTS

(71) Applicant: President and Fellows of Harvard College, Cambridge, MA (US)

(72) Inventors: Yanina Shevchenko, Cambridge, MA (US); George M. Whitesides, Newton, MA (US); Adam Stokes, Watertown, MA (US); Gabrielle Compton, Welling, OK (US); Alex Nemiroski, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,583

(22) Filed: Aug. 1, 2017

(65) Prior Publication Data

US 2018/0003200 A1 Jan. 4, 2018

Related U.S. Application Data

(63) Continuation of application No. 14/752,558, filed on Jun. 26, 2015, now Pat. No. 9,719,534.

(Continued)

(51) Int. Cl.
*F15B 15/10* (2006.01)
*B62D 57/032* (2006.01)

(52) U.S. Cl.
CPC .......... *F15B 15/103* (2013.01); *B62D 57/032* (2013.01); *F15B 2215/305* (2013.01)

(58) Field of Classification Search
CPC ...... F15B 15/103; B62D 57/032; B62D 21/15
See application file for complete search history.

(56) References Cited

U.S. PATENT DOCUMENTS

| 3,924,519 A | * 12/1975 | England | .................. B25J 15/12 138/119 |
| 4,751,869 A | 6/1988 | Paynter | |

(Continued)

FOREIGN PATENT DOCUMENTS

AU 770260 B2 2/2004

OTHER PUBLICATIONS

Correll et al., "Soft Autonomous Materials—Using Active Elasticity and Embedded Distributed Computation", Experimental Robotics: The 12th International Symposium on Experimental Robotics, Springer; 2014 edition (Aug. 20, 2013), ISBN-10: 3642285716, vol. 79, 14 pages.

(Continued)

*Primary Examiner* — Hau V Phan
(74) *Attorney, Agent, or Firm* — Wilmer Cutler Pickering Hale and Dorr LLP

(57) ABSTRACT

A modular pneumatic robotic actuator, including a first elongated hollow structure and a second elongated hollow structure connected to each other at a moveable joint; an inflatable bladder comprised of an elastomeric material disposed at the said joint and immobilized between the first and second hollow structures, wherein the said inflatable bladder inflates preferentially away from the joint; and a restraining membrane comprised of an elastomeric material disposed over the bladder and connecting the first and second hollow structures, wherein the said restraining membrane is relaxed when the bladder is deflated.

17 Claims, 28 Drawing Sheets

Related U.S. Application Data

(60) Provisional application No. 62/017,606, filed on Jun. 26, 2014.

(56) References Cited

U.S. PATENT DOCUMENTS

| | | | |
|---|---|---|---|
| 4,944,755 A | | 7/1990 | Hennequin et al. |
| 4,976,191 A | * | 12/1990 | Suzumori ............... B23Q 1/34 |
| | | | 92/103 R |
| 5,083,498 A | | 1/1992 | Sato et al. |
| 5,245,855 A | | 9/1993 | Burgel et al. |
| 5,937,732 A | * | 8/1999 | Homann ............... F15B 15/103 |
| | | | 92/43 |
| 6,484,601 B1 | | 11/2002 | Arrichiello |
| 6,732,015 B2 | | 5/2004 | Maeda |
| 7,086,322 B2 | | 8/2006 | Schulz |
| 7,258,379 B2 | | 8/2007 | Ono et al. |
| 8,100,451 B2 | | 1/2012 | Okuda et al. |
| 8,240,730 B2 | | 8/2012 | Schaller |
| 9,719,534 B2 | * | 8/2017 | Shevchenko ......... F15B 15/103 |
| 2006/0125291 A1 | * | 6/2006 | Buravalla ............... B62D 21/15 |
| | | | 296/204 |
| 2009/0058132 A1 | * | 3/2009 | Browne ................. B60R 11/00 |
| | | | 296/181.7 |
| 2013/0025656 A1 | * | 1/2013 | Yang ................ H01L 31/02168 |
| | | | 136/255 |

OTHER PUBLICATIONS

International Search Report and Written Opinion dated on Oct. 6, 2015 in the International application No. PCT/US15/38093, filed on Jun. 26, 2015, 9 pages.

Konishi, et al., "Merging micro and macro robotics toward micro manipulation for biomedical operation", Proceedings Of The 36th International Symposium on Robotics, Tokyo, Japan, Nov. 29-Dec. 1, 2005 (6 pages).

* cited by examiner

PNEUMATIC INSECT ROBOTS

CROSS REFERENCE TO RELATED APPLICATION

The present application is a continuation of U.S. patent application Ser. No. 14/752,558, entitled "Pneumatic Insect Robots," filed on Jun. 26, 2015, which claims the benefit of priority from U.S. Patent Application No. 62/017,606, filed on Jun. 26, 2014, the disclosures of each of which are incorporated herein in their entirety by reference thereto.

STATEMENT REGARDING FEDERALLY SPONSORED RESEARCH OR DEVELOPMENT

The present invention was made with United States government support under Grant No. W911NF-11-1-0094 awarded by the Defense Advanced Research Planning Agency. The United States government has certain rights in this invention.

BACKGROUND

Robots, like animals, are typically designed for five fundamental functions, namely, sensing, signaling, motion, intelligence and a source of energy. Industrial robots, that perform repetitive or explicitly defined functions in a static, mapped environment (e.g., robot arms) require: sensors to determine their position; lights to signal activity; electronic motors to move their limbs or grippers; a computer to direct the motion and run feedback loops and a tethered, electrical supply of power.

In contrast, service robots must be capable of interacting safely with humans in a dynamic, unmapped environment. These types of robots typically require sensors that are capable of detecting obstacles; a computer running sophisticated software to direct their motion and environmental interactions and a source for power. Nevertheless, these robots also suffer from drawbacks. The requirements of being able to dynamically sense, learn, and interact safely with an unmapped environment causes these robots to be slow and the power requirements for computers, motors and batteries results in excessive cost for fabrication of these robots.

Robotic systems used for industrial automation or service robots are manufactured from precisely machined hard parts with electric motors that require sensors to enable accurate control of their motion. Suitable examples of these sensors are cameras, accelerometers, and position encoders that provide the input to feedback loops. The algorithms used in this type of active control systems work well in static, well defined, and pre-mapped environments, but often have great difficulty adapting to the kinds of unstructured and complex terrains found in nature.

In contrast, insects such as spiders and cockroaches possess compliant structures or limbs that enable passive adaptability to unpredictable and dynamic environments, without requiring a complex control system. The control system in these animals is referred to as "embodied intelligence" and extends beyond the brain and into the physical design and construction of the body and limbs of the insect, which is analogous to the electronic system and actuators of the robot, respectively.

The design principle of "embodied intelligence," places some control and mechanical compliance directly into the limbs of the robots. Using this principle a new trend has emerged in the robotics industry and are seen in robots such as RHex (Kod Lab, UPenn), or DASH (Biomimetic Millisystems Lab, Berkley). Newer industrial robots such as Baxter (Rethink Robotics) rely on Series Elastic Actuators that couple electric motors to the limbs using an elastic linkage. This design provides the robotic arms with lower reflected mechanical impedance and increases safety in the human-robot interaction.

In an attempt to mimic the functions of gripping, camouflage, and locomotion found in animals such as the octopus or squid, soft elastomers have recently been used to develop a new type of nature-inspired robot, called "soft robots." These "soft robots" are typically designed using silicone elastomers that are less dense and more flexible than the metals used in conventional "hard robots." Due to their inherent mechanical compliance and the fact that they are softer than humans, these robots are capable of interacting safely in a dynamic, unmapped environment without inflicting any harm. However, a size limitation is imposed due to the low stiffness-to-density-ratio ($\kappa$:$\rho$) of the material. Silicone elastomers are too heavy to be used as support material in medium to large-scale robots that need to move quickly and efficiently.

In nature, the above problem is addressed by combining materials with complementary properties. A low-density material such as bone is used to form the load bearing skeletal support, whereas a higher-density material like muscle is used to actuate motion. This facilitates support of a larger amount of weight while at the same time allowing for quick and efficient operation with a greater range of motion. Further, nature uses tendons in the joints to store energy in the extension phase of the gait which is released on contraction. This increase the animal's output power and mechanical efficiency.

In an effort to recreate this power and efficiency, new robotic joints that are modular in nature and combine an elastomeric actuation device with a structural support are desired. Currently, robots of this sort that are light-weight, low-cost, and do not require elaborate assembly and fabrication are not available.

SUMMARY

This disclosure describes modular pneumatic robotic actuators that can function as robotic joints. The actuators include soft elastomeric bladder immobilized by hollow tubular structures that are bent in their resting state. Upon actuation of the robotic joint, the elastomeric bladder expands, causing movement of the hollow tubular structure around the joint the place where the defect was introduced.

A method of fabrication of the pneumatic robotic actuator and further the fabrication of pneumatic insect-inspired robots is described.

In one aspect, a modular pneumatic robotic actuator includes a first elongated hollow structure and a second elongated hollow structure connected to each other in a way that creates a moveable joint about the point of contact. Inside, there is an inflatable bladder made of an elastomeric material is disposed at the joint and immobilized between the first or second hollow structure, wherein the inflatable bladder inflates preferentially away from the joint; and a restraining membrane made of an elastomeric material is disposed over the bladder and connects the first and second hollow structures. The restraining membrane is in a relaxed position when the bladder is deflated.

In one or more embodiments, the first and second hollow structures provide a first preselected angle at the joint when the restraining membrane is in a relaxed position.

In any of the preceding embodiments, the first and second hollow structures provide a second preselected angle at the joint when the restraining membrane is in an actuated position.

In any of the preceding embodiments, the inflatable bladder can be pressurized to inflate from a relaxed position to an actuated position, wherein the bladder is positioned to exert a positive pressure on the restraining membrane.

In any of the preceding embodiments, the restraining membrane brings the first and second hollow structures from the actuated position to the relaxed position upon removal of pressure in the inflatable bladder.

In any of the preceding embodiments, the first and second elongated hollow structure is made of a low density material capable of holding the structure of the robot.

In any of the preceding embodiments, the first and second elongated hollow structure is made of a low density material, wherein the material is selected from a group consisting of aluminum, copper, brass, polypropylene, poly(vinyl chloride), polycarbonate, poly(tetrafluoroethylene), polyisobutylene, polystyrene, polyacrylonitrile, poly(methyl acrylate), poly(methyl methacrylate), polybutadiene, polychloroprene, poly(cis-1,4-isoprene), and poly(trans-1,4-isoprene).

In any of the preceding embodiments, the inflatable elastic bladder and the restraining membrane are made of an elastomeric material selected from the group consisting of polyisoprene, polybutadiene, polyurethane, polychloroprene, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, and polysulfide rubber.

In any of the preceding embodiments, the inflatable bladder, the restraining membrane and a substantial part of the first and second hollow structures of the pneumatic actuator joint are covered by a fabric material. In some of the embodiments, the fabric material provides additional reinforcement to the pneumatic actuator joint. A suitable example of fabric material that can be used for this purpose is spandex.

In any of the preceding embodiments, the joint is a thinned strip of the same material used for the first and second hollow elements. In some embodiments, the joint is integral with the first and second hollow elements.

In any of the preceding embodiments, the joint is a thinned strip made of a different material other than the first and second hollow elements.

In some embodiments, the thinned strips are glued to the end of the first and second hollow element where they are connected.

In some embodiments, the joint is a pin.

In some embodiments, the joint is a ring that passes through a hole located at the end of the first and second hollow element where the two hollow elements are connected In some embodiments, the joint is a hinge. In some embodiments, the ends of the hinge are glued or screwed on to the end of the first and second hollow element where they are connected.

In another aspect, a method of actuating the modular pneumatic actuator in any of the preceding embodiments in an actuated position is performed by pressurizing the inflatable bladder with a gas, wherein the bladder material expands to exert a positive pressure on the restraining membrane and a force on the first and second hollow structures, wherein the said positive pressure causes the restraining structure to be strained in a direction away from the joint of the first and second hollow structure and creates a force that causes the ends of the hollow structures to move apart about the joint.

In another aspect, a method of actuating the modular pneumatic actuator in any of the preceding embodiments into a relaxed position includes depressurizing the inflatable bladder filled with a gas to deflate it, wherein deflating the bladder causes the restraining membrane to exert a positive pressure on the bladder material and a force on the first and second hollow structures in the inward direction towards the joint, wherein the said force on the first and second hollow structures causes the distal end of the first and the second hollow structures to move towards each other about the joint.

In another aspect, a modular pneumatic robot limb includes, at least two modular pneumatic robotic actuators according to any of the preceding embodiments.

In another aspect, a modular pneumatic robot limb includes, two modular pneumatic robotic actuators according to any of the preceding embodiments.

In another aspect, a modular pneumatic robot limb includes, four modular pneumatic robotic actuators according to any of the preceding embodiments.

In any of the preceding embodiments, the modular pneumatic robotic actuators can be individually actuated or relaxed.

In another aspect, a modular pneumatic robot includes, at least one modular pneumatic robot limb according to any of the preceding embodiments.

In another aspect, a modular pneumatic robot comprising, one modular pneumatic robot limb according to any of the preceding embodiments.

In another aspect, a modular pneumatic robot comprising, two modular pneumatic robot limbs according to any of the preceding embodiments.

In another aspect, an insect robot comprising, four modular pneumatic robotic actuators according to any of the preceding embodiments.

In another aspect, a method of moving the modular pneumatic robots according to any of the preceding embodiments includes actuating and relaxing the modular pneumatic actuator according to any of the preceding embodiments in a predetermined sequence.

In another aspect, a method according to any of the preceding embodiments, wherein the predetermined sequence includes bringing one of the two adjacent actuators into actuated position while the other remains in relaxed position.

In another aspect, a method according to any of the preceding embodiments, wherein the predetermined sequence comprises of bringing two adjacent actuators into actuated position.

DETAILED DESCRIPTION

The present invention discloses modular pneumatic joints that are insect-inspired and capable of a range of movements. These modular pneumatic actuator joints are prepared using a first and second hollow structure that are connected at a point to form a joint such that the proximal ends of the first and second hollow structures that form the joint can move towards and away from each other. At the joint, an inflatable bladder that inflates preferentially in one direction is disposed and immobilized. On inflation of the bladder, the bladder extends in an outward direction away from the joint of the first and the second hollow structures. The outward motion causes the joint to 'open'. A restraining membrane disposed over the bladder and attached to the first and the second hollow structures returns the join to its resting state, thereby 'closing' the joint. The restraining membrane remains in a relaxed position when the bladder is deflated, holding the joint in a closed position.

Modular Pneumatic Actuator Joint

Figure 1A:
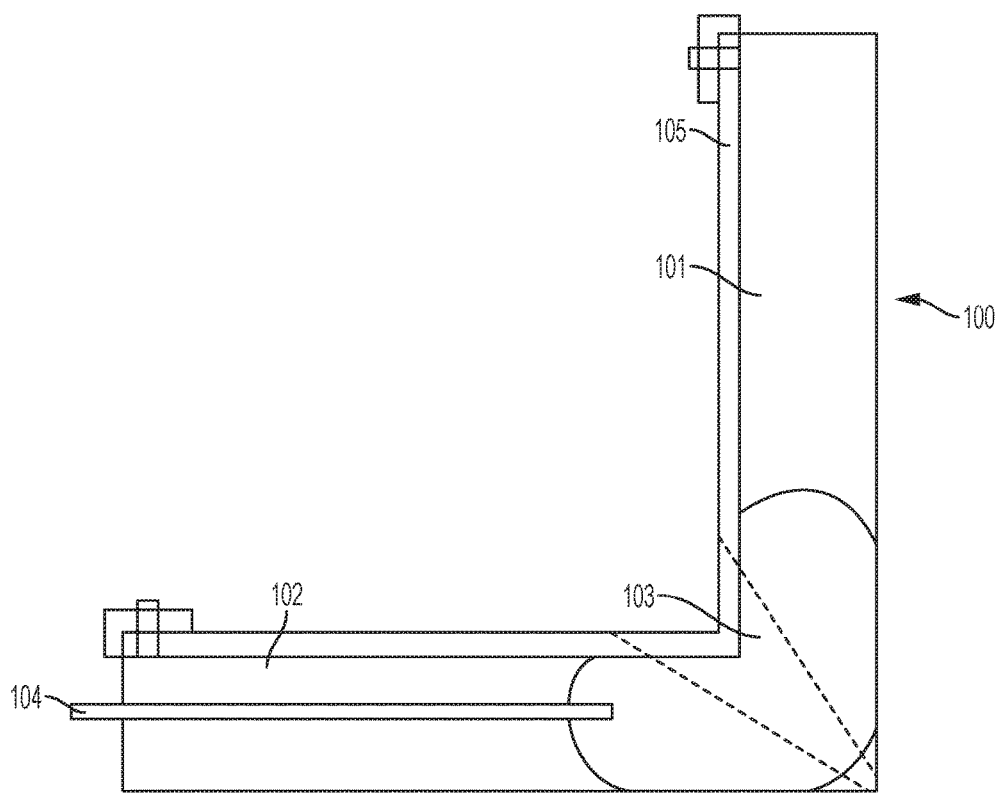
FIG. 1A is a schematic of an embodiment of the assembled pneumatic actuator joint when the actuator is in unpressurized position

FIG. 1A is a schematic of an embodiment of the assembled pneumatic actuator joint 100 when the actuator is in relaxed position. The joint functions as device connecting the first and second hollow structures 101 and 102 and facilitates their movement around the joint.

An elastic bladder 103 is disposed and immobilized at the joint of first and second hollow structures 101 and 102. The elastic bladder is selected to provide inflation in a direction away from the joint of first and second hollow structures 101 and 102. In an embodiment the preferential expansion of bladder 103 is achieved by variation in the thickness of the bladder walls with one side thinner than the remaining bladder, causing the bladder to preferentially inflate in the direction of the thinner-walled bladder section. In yet another embodiment, the inflation of bladder 103 causes preferential expansion in one directions by providing restraining walls in first and second hollow structures 101 and 102. Upon inflation, the bladders inflates and is arrested by the walls provide in first and second hollow structures 101 and 102 and the inner body of the first and second hollow structures 101 and 102, with only one direction available for expansion, which is away from the joint of first and second hollow structures 101 and 102. Connective tubing 104 transports gas to and from elastic bladder 103 causing it to inflate or deflate.

A restraining membrane 105, made of an elastic material, is attached at one end to first hollow structure 101 and at the other end to second hollow structure 102. Further, restraining membrane 105 is disposed so that it remains in contact with the bladder material when the modular pneumatic actuator joint is in rest position. In an embodiment restraining membrane 105 is attached to first and second hollow structures 101 and 102 by an adhesive or secured by tying with a string, rope or a similar fastening device. In yet another embodiment, restraining membrane 105 is firmly secured to first and second hollow structures by tying it with a rope or a string. In yet another embodiment, first and second hollow structures 101 and 102 have hooks or similar attachment devices and restraining membrane 105, is disposed on the attachment devices on first and second hollow structures 101 and 102 by means of threading the elastic through complementary holes on both ends of restraining membrane 105, one corresponding to each of first and second hollow structures 101 and 102.

The joint of first and second hollow structures 101 and 102 can be achieved by cutting a notch into a straight hollow structure to introduce tapered edges that meet in a relaxed state and separate in an actuated state. In some embodiments first and second hollow structures 101 and 102 are joined together by a web of material integral to the two hollow ends. In yet another embodiment, first and second hollow structures 101 and 102 are joined together by a hinge or a metallic pin passing through holes provided at the point where the first and second hollow structures 101 and 102 meet. One skilled in the art would be able to device other methods not disclosed here to join first and second hollow structures 101 and 102 that allows them to open and close at the joint connecting them.

Figure 1B:
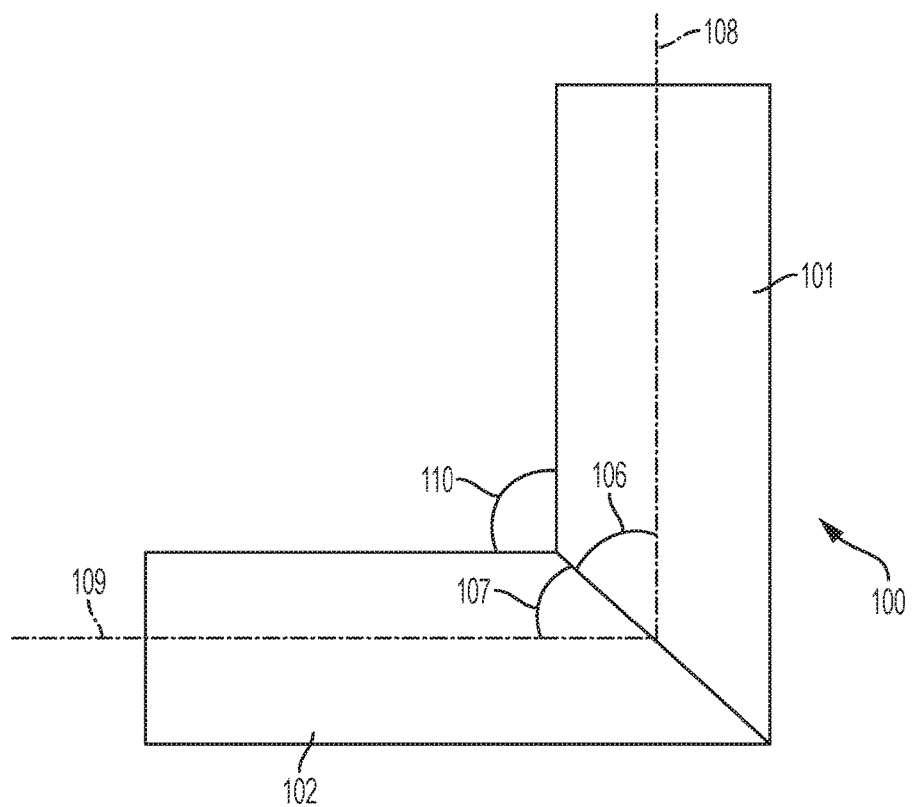
FIG. 1B is a schematic that shows that varying the angle of cut of first and second hollow structures with respect to the central axis of first and second hollow structures governs the angle that is achieved in the relaxed position.

FIG. 1B is a schematic that shows that varying the angle of cut 106 and 107 of first and second hollow structures, 101 and 102 with respect to the central axis 108 and 109 of first and second hollow structures governs the angle that is achieved in the relaxed position. By making the angle of cut of first and second hollow structures, 106 and 107 with respect to the central axis of first and second hollow structures smaller, a smaller angle at relaxed position 110 for the actuator can be attained.

In an embodiment, angle of cut to central axis of the hollow structures 106 and 107, is the same. In yet another embodiment, angle of cut to the central axis of the hollow structures 106 and 107, is not the same.

Advantageously, the angle of cut to the central axis of the hollow structures 106 and 107 can be used to specifically control the range of motion achieved by the modular pneumatic actuator joint 100. In some embodiments, the angle of cut, relative to the central axis of the hollow structures 106 or 107, can be individually selected to be between 5 degrees and 85 degrees.

Figure 2:
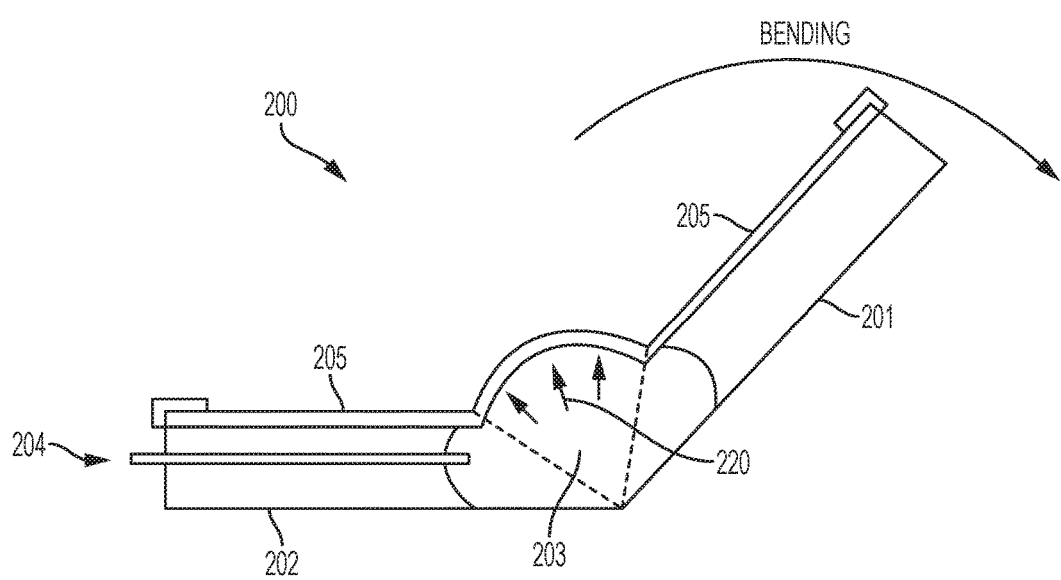
FIG. 2 is a schematic illustration of an embodiment of an assembled pneumatic actuator joint when the actuator is in actuated position.

FIG. 2 is a schematic illustration of an embodiment of an assembled pneumatic actuator joint 200 while in the actuated position. An elastic bladder 203, that is disposed and immobilized at the joint of a first and second hollow structures 201 and 202, is inflated by pressurizing bladder 203 through transport of air into the bladder through the connective tubing 204 such that bladder 203 inflates in a direction away from the joint of first and second hollow structures 201 and 202 (indicated by arrows 220). The inflation of elastomeric bladder 203 through transport of gas into the bladder, results in the application of a positive pressure on the restraining membrane 205 causing it to stretch away from the joint of first and the second hollow structures 201 and 202. At the same time the inflated bladder 203 also applies a force on both first and second hollow structures 201 and 202 causing the distal ends of the modular pneumatic actuator to move away from each other by around the joint.

Upon removal of the applied pressure, the gas that inflates elastomeric bladder 203 is transported out back through the connective tubing 204 relieving the positive pressure on restraining membrane 205. This causes restraining membrane 205 to contract causing the distal ends of first and second hollow structures 201 and 202 to move towards each other around the joint. This results in the modular pneumatic actuator joint 200 to return to its relaxed position as shown in FIG. 1A.

In some embodiments the actuated position of the modular pneumatic actuator joint forms an angle ranging from about 20 degrees to about 180 degrees between first and second hollow structures 201 and 202.

Figure 3:
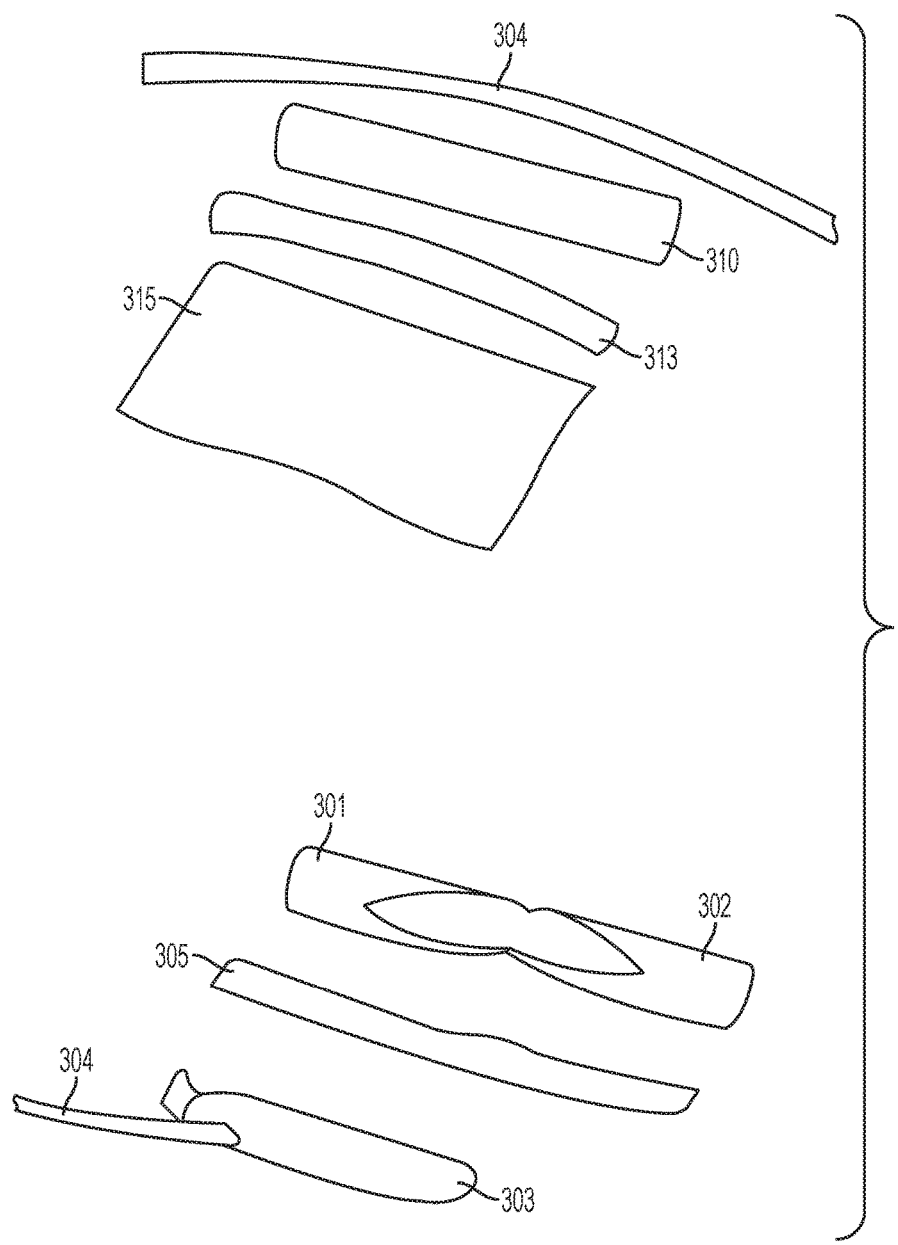
FIG. 3 shows the various components used for making the modular pneumatic actuator joint according to one embodiment

FIG. 3 shows the various components used for making the modular pneumatic actuator joint according to one embodiment. A hollow structure 310 is used to produce the first and second hollow structures 301 and 302. In some embodiments, the hollow structure 310 is notched to leave the resulting hollow structures 301 and 302 connected to each other at a point, about which the distal end of the hollow structures 301 and 302 can move away or towards each other. In some embodiments the material used for producing this are selected from a group consisting of aluminum, copper, brass, polypropylene, poly(vinyl chloride), polycarbonate, poly(tetrafluoroethylene), polyisobutylene, polystyrene, polyacrylonitrile, poly(methyl acrylate), poly(methyl methacrylate), polybutadiene, polychloroprene, poly(cis-1, 4-isoprene), and poly(trans-1,4-isoprene). In an embodiment, the first and second hollow structures 301 and 302, respectively of the modular pneumatic actuator joint can be made using polypropylene straws. 313 is a tubular elastomeric material that is used to form an inflatable bladder 303 which inflates preferentially in one direction. 304 is connective tubing that is used to transport the gas to and away from inflatable bladder 303. The inflatable bladder is made of a material that is elastomeric and can be selected from a group consisting of polyisoprene, polybutadiene, polyurethane, polychloroprene, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, and polysulfide rubber. In an embodiment, the inflatable bladder is made by heat sealing the elastomeric material at the edges with an opening provided by the connective tubing 304 to facilitate transport of gas to be used for pressurizing the bladder 303. 315 is another elastomeric material that is used to form a restraining membrane 305 that is disposed to cover inflatable bladder 303 and attached to first and second hollow structures 301 and 302. Restraining membrane 305 is made of a material that is elastomeric and can be selected from a group consisting of polyisoprene, polybutadiene, polyurethane, polychloroprene, butyl rubber, halogenated butyl rubber, styrene-butadiene rubber, nitrile rubber, hydrogenated nitrile rubber, ethylene propylene rubber, ethylene prorpylene diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, and polysulfide rubber. In an embodiment, restraining membrane 305 is made of strips cut from an air balloon.

Figure 4:
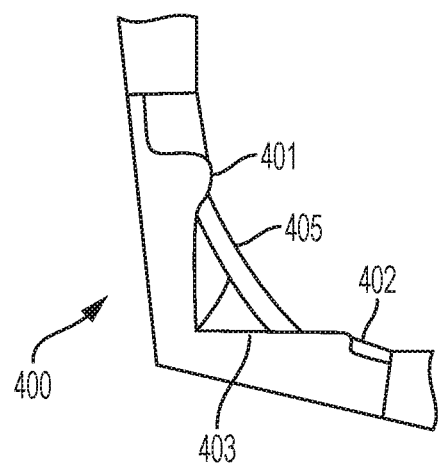
FIG. 4 is a photograph of a pneumatic actuator joint prepared using the materials and components shown in FIG. 3 in relaxed position where the angle between the first and second hollow structure is about 80 degrees.

FIG. 4 is a photograph of a pneumatic actuator joint prepared using the materials and components shown in FIG. 3. FIG. 4 shows an embodiment of an assembled pneumatic actuator joint 400 in relaxed position where the angle between the first and second hollow structure 401 and 402 is about 80 degrees. In the relaxed position, the elastomeric bladder 403 is in a deflated state and the restraining membrane 405 is not stretched.

Figure 5:
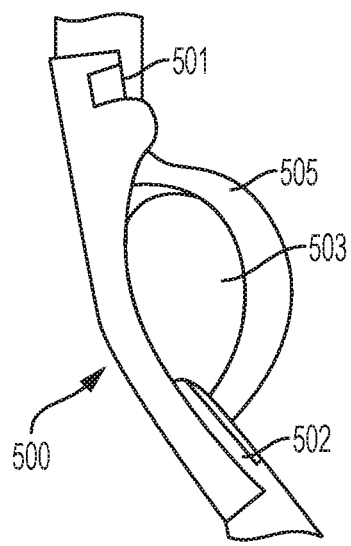
FIG. 5 shows an embodiment of the assembled pneumatic actuator joint in actuated position where the angle between the first and second hollow structure is about 130 degrees.

FIG. 5 shows an embodiment of the assembled pneumatic actuator joint 500 in actuated position where the angle between the first and second hollow structure 501 and 502, is about 130 degrees. Upon actuation, the elastomeric bladder 503 is inflated and applies pressure on the restraining membrane 505 causing it to be stretched away from the joint of first and second hollow structures 501 and 502. At the same time inflated bladder 503 also applies a force on both first and second hollow structures 501 and 502 causing the distal ends of the modular pneumatic actuator to move away from each other around the joint.

The movable joint can be implemented in the device in a number of ways. In one or more embodiments, the joint can be a thinned strip of the same material used for the first and second hollow elements; the joint can be integral with the first and second hollow elements. In other embodiments, when the material of the thinned strip is made of a different material other than the first and second hollow elements, each of the two ends of the thinned strips are glued to the end of the first and second hollow element where they are connected. In other embodiments, the movable joint can be a pin. A pin is a thin strip of metal that is used to form a joint connecting the first and second hollow elements. In some embodiments, each end of the pin is passed through a hole located at the end of the first and second hollow element where the two hollow elements are connected and held in place through commonly used methods that form a head at the end of the pin which has a larger diameter than the hole in the first and second hollow elements and the diameter of the body of the pin itself. Some commonly used methods that form a head to secure a pin are, placement of bolt at the end of the pin, flattening the material at end of the pin to form a head, splitting the end of the pin to form prongs and bending the split prongs radially away from each other. An individual with ordinary skill in the art can envisage other methods for securing the pin to connect the first and second hollow element. In other embodiments, the movable joint can be a ring that passes through a hole located at the end of the first and second hollow element where the two hollow elements are connected. In other embodiments, the movable joint can be a hinge, having for example a configuration similar to a door hinge. Each of the two ends of the hinge are glued to or screwed on to the end of the first and second hollow element where they are connected.

Figure 6A:
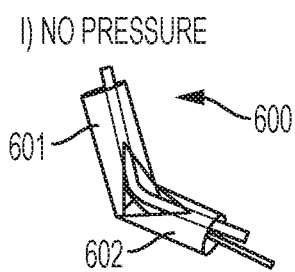
FIG. 6A shows a schematic of an embodiment of the assembled pneumatic actuator joint in relaxed position where the first and second hollow structures and are joint together with a metallic pin.
Figure 6B:
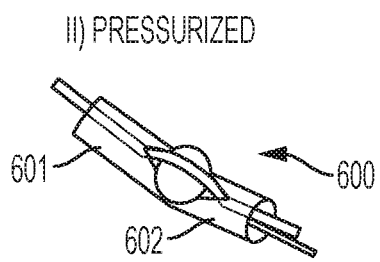
FIG. 6B shows a schematic of the assembled pneumatic actuator joint of FIG. 6A in an actuated position.
Figures 6C, 6D:
FIG. 6C shows an image of the assembled pneumatic actuator joint with a metallic pin connecting the first and second hollow structures in relaxed position.
FIG. 6D shows an image of the assembled pneumatic actuator joint with a metallic pin connecting the first and second hollow structures in actuated position.

FIG. 6A shows a schematic of an embodiment of the assembled pneumatic actuator joint 600 in relaxed position where the first and second hollow structures 601 and 602 are joint together with a metallic pin. FIG. 6B shows a schematic of the assembled pneumatic actuator joint 600 in an actuated position. FIG. 6C shows an image of the assembled pneumatic actuator joint 600 in relaxed position. FIG. 6D shows an image of the assembled pneumatic actuator joint 600 in actuated position.

Figure 7A:
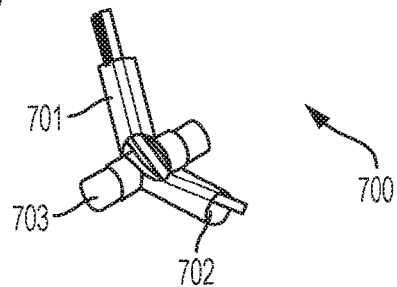
FIG. 7A shows a schematic of an embodiment of the assembled pneumatic actuator joint in relaxed position where the first and second hollow structures and are connected via door hinge joint.
Figure 7B:
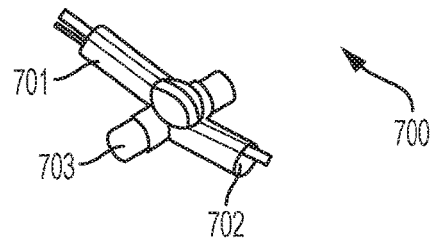
FIG. 7B shows a schematic of the assembled pneumatic actuator joint shown in FIG. 7A in an actuated position.
Figure 7C:
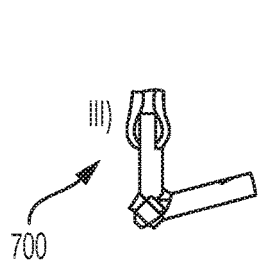
FIG. 7C shows an image of the assembled pneumatic actuator joint with a door hinge joint connecting the first and second hollow structures in relaxed position.
Figure 7D:
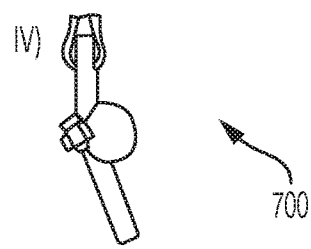
FIG. 7D shows an image of the assembled pneumatic actuator joint with a door hinge joint connecting the first and second hollow structures in actuated position.

FIG. 7A shows a schematic of an embodiment of the assembled pneumatic actuator joint 700 in relaxed position where the first and second hollow structures 701 and 702 are connected via door hinge joint 703. FIG. 7B shows a schematic of the assembled pneumatic actuator joint 700 in an actuated position. FIG. 7C shows an image of the assembled pneumatic actuator joint 700 in relaxed position. FIG. 7D shows an image of the assembled pneumatic actuator joint 700 in actuated position.

In some embodiments, the joint of the assembled pneumatic actuator comprises of a housing which contains the inflatable bladder. In some embodiments, the housing is 3D printed.

Insect Robot Limb

In another aspect, using modular pneumatic actuator joints described in the preceding section it is possible to fabricate a two stage actuator, modeled after insect limbs; herein after referred to as "insect robot limbs". Each insect robot limb can include at least one modular pneumatic actuator joint. In one or more embodiments, each insect robot limb includes more than two modular pneumatic actuator joints. In one or more embodiments, the joints are actuated together. In one or more embodiments, the joints have the ability to be actuated independently, by providing a separate gas actuation source for each joint.

Figure 8:
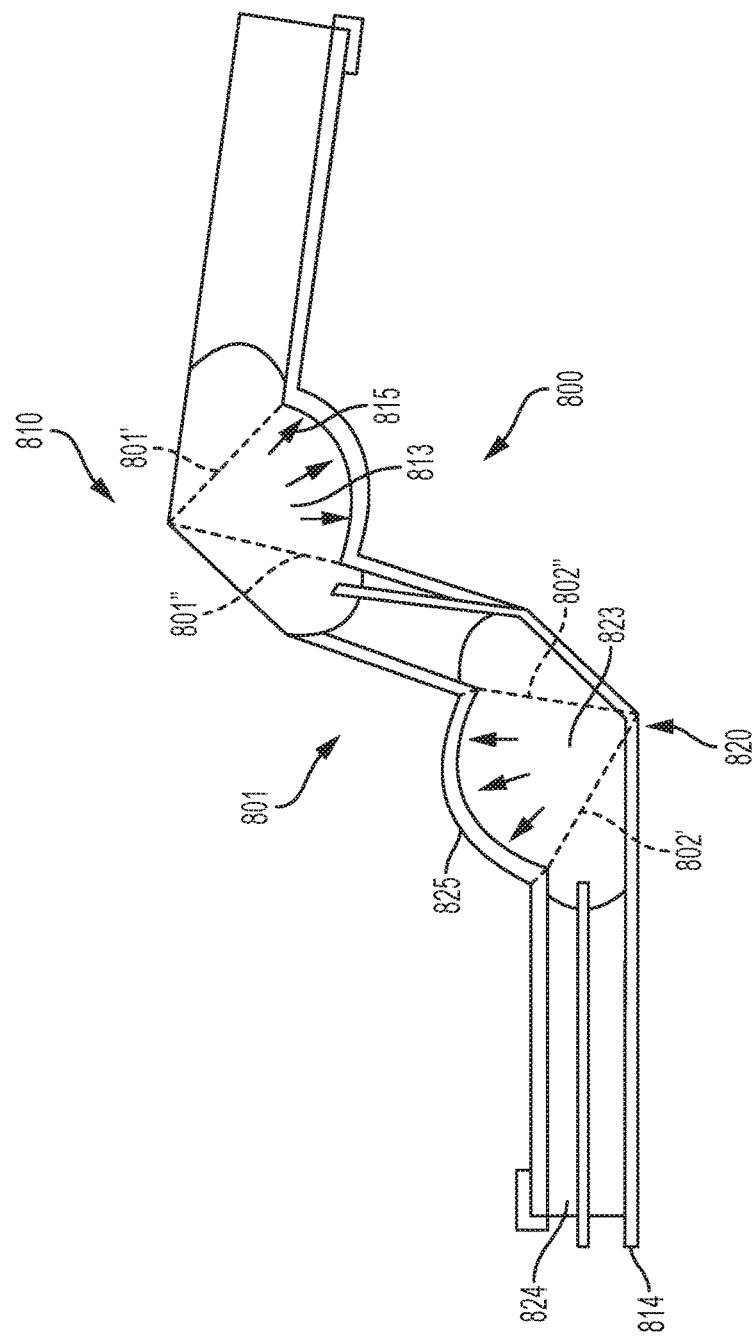
FIG. 8 is a schematic of the insect robot limb including two assembled pneumatic actuator joints rotated with respect to each other by 180 deg in accordance with this disclosure

FIG. 8 is a schematic of the insect robot limb 800 including two assembled pneumatic actuator joints in accordance with this disclosure. In this embodiment of the insect robot limb, the modular pneumatic actuator joints are attached to each other directly, that is, they are formed from a single hollow tube that has been modified to contain two joints. With reference to FIG. 8, a single hollow structure 801 contains two sets of tapered edges, 8', 801" and 802', 802", which form joints 810 and 820, respectively. Each joint 810 and 820 is equipped with a bladder 813 and 823, and a restraining structure 815 and 825, respectively. Depending on the location of the joints (discussed in detail below), the restraining structures can integral or separate elements. Each joint 810 and 820 also is in fluidic communication with a pressurization source. Individual sources 814 and 824 can be used to provide independent actuation. Alternatively, a single source can be used to serially communicate with a plurality of bladders. In one more embodiments, actuation occurs as previously described.

Figure 9:
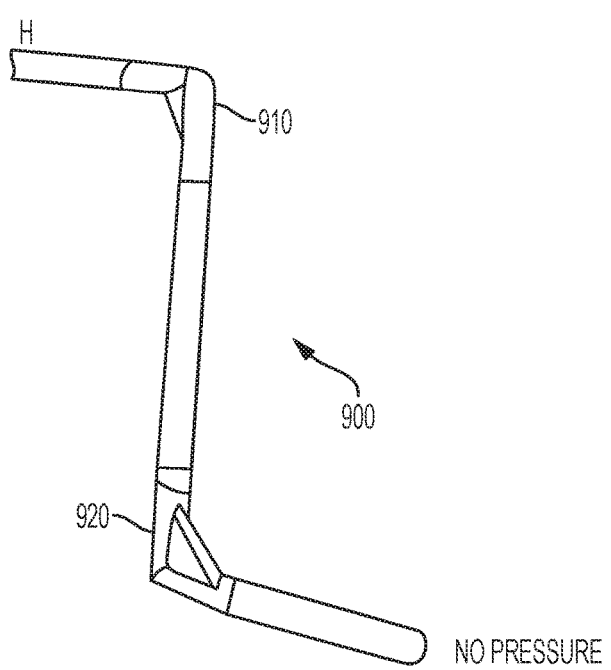
FIG. 9 is an embodiment of the insect robot limb including two assembled pneumatic actuator joints on opposing sides of the insect robot limb, with both the actuators in relaxed position.
Figure 10:
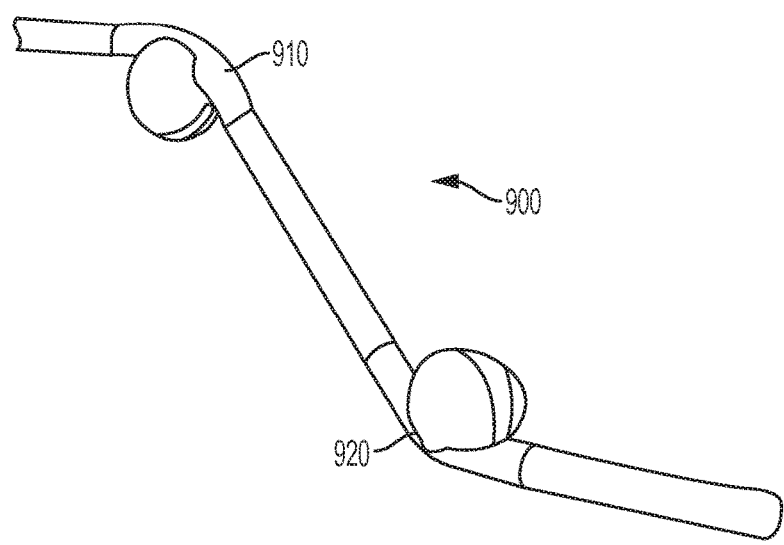
FIG. 10 shows the extension of the insect robot in FIG. 9 during actuation.

The spacing and location of the joints can be selected to obtain a desired type and range of motion. For example, when it is desired for the robot to exhibit extension motion, the joints can be located on the opposite side of the insect robot limb. FIGS. 9 and 10 illustrate this range of motion. FIG. 9 is an embodiment of the insect robot limb 700 including two assembled pneumatic actuator joints 910 and 920 on opposing sides of the insect robot limb, with both the actuators in relaxed position. FIG. 10 shows the extension of the insect robot 700 after actuation. Note the visible expanded bladder at each of the joints.

In yet another embodiment of the pneumatic insect robot limb 800, the modular pneumatic joints of the first and second modular pneumatic actuator 810 and 820, are facing the same side. Such an arrangement can be selected when a closing or 'grasping' motion is desired. In yet another embodiment of the pneumatic insect robot, the modular pneumatic joints of the first and second modular pneumatic actuators 810 and 820, are not facing the same side.

In an embodiment of the insect robot limb 800, the modular pneumatic actuator joints 810 and 820, can be attached to each to each other using another hollow structure of predetermined length. In yet another embodiment of the insect robot limb 800, the connective tubing 814 and 824, transporting gas to and from the bladder is substantially contained inside the hollow structures of the limb. In yet another embodiment of the insect robot limb, the connective tubing substantially travels along the hollow structures of the insect robot limbs.

Insect Robots and their Motion

In another aspect of the invention, insect robots providing a range of motion can be produced by using one or more of the above described insect robot limbs. In some embodiments there is only one modular pneumatic actuator joint in an insect robot limb. In yet another embodiment, there are two modular pneumatic actuator joints in an insect robot limb. In yet another embodiment there are more than one modular pneumatic actuator joints in an insect robot limb. As the number of insect robot limbs increase in the insect robot, the number of directions and complexity of sequence available to move the insect robot also increases. In some embodiments, when there are more than one insect robot limbs used to produce the insect robot, the number of modular pneumatic actuator joints in the various insect robot limbs are same. In yet another embodiment, when there are more than one insect robot limbs used to produce the insect robot, the number of modular pneumatic actuator joints in the various insect robot limbs are different. In yet other embodiments, the insect robot can have a combination of actuatable and rigid limbs. See, e.g., FIG. 17.

In some embodiments, a friction enhancing material is disposed on the end of the insect robot limb or limbs, that may come in contact with the ground during motion to enhance the movement of the insect robot. The friction enhancing material can be made of material such as, but not limited to, an abrasive or a textured surface made of silicone or rubber.

Figure 11A:
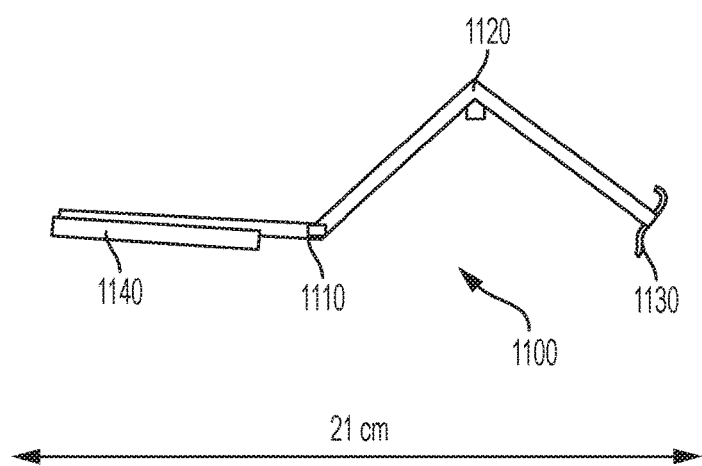
FIGS. 11A, 11B, and 11C shows a crawling insect robot and the various steps involved in moving the crawling insect robot.
Figure 11B:
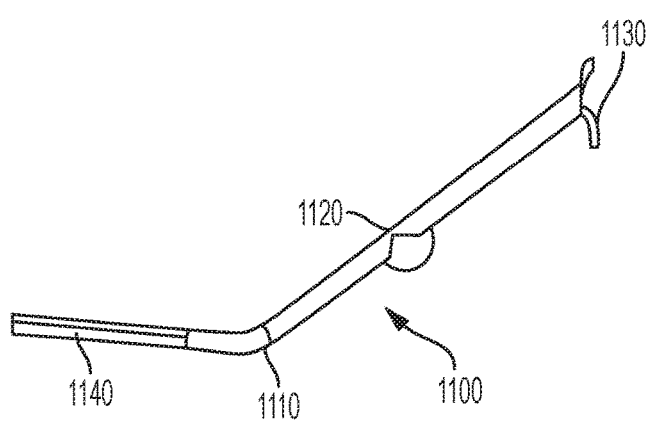
Figure 11C:
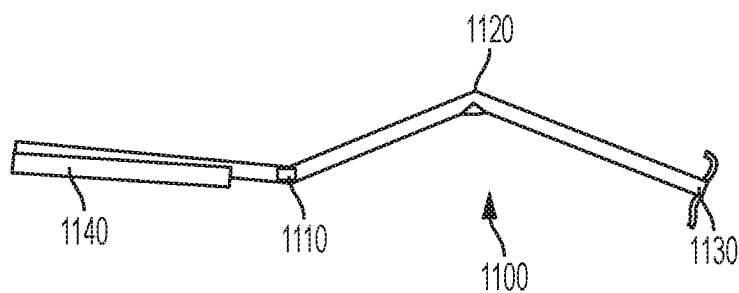

FIGS. 11A, 11B, and 11C show an embodiment of a crawling insect robot 900 and the various steps involved in moving the crawling insect robot. FIG. 11A shows a crawling insect robot 1100 with one insect robot limb 1101 having two modular pneumatic actuator joints 1110 and 1120 and a foot 1130 and a body 1140. The foot 930 provides a means to provide initial contact with the surface ahead in the direction of movement once the joints are actuated. Upon regaining contact with the ground at a point ahead of the initial location the limb anchors to the new location and drags the remaining body 1140 forward using the steps described below.

The insect robot 1100 is shown with both the modular pneumatic actuator joints 1110 and 1120 in their relaxed position and the foot of the insect robot 1130 pointing in the direction of the desired motion. In some embodiments, foot 1130 of the insect robot limb has a friction enhancing material disposed on it. In another embodiment, body 1140 of the insect robot can be equipped with a floatation device to enable it to remain afloat on a liquid medium. In yet another embodiment, foot 1130 can be modified into paddling device to facilitate forward movement through the liquid medium.

Movement in the direction indicated by the arrow in FIG. 11A is possible. To move insect robot 1100 in a direction from left to right, independently controlled modular pneumatic actuator joint 1120 is first actuated and brought into an actuated position. FIG. 11B shows the intermediate step that is attained when the modular pneumatic actuator 1120, is in an actuated position and the foot of the insect 1130 is in air. This step is followed by actuation of modular pneumatic actuator joint 1110 to bring it to an actuated position. Once, modular pneumatic actuator joint 1110 is completely actuated the foot of the insect robot 1130 is again in contact with the ground and both modular pneumatic actuator joints 1110 and 1120 are in an actuated position. FIG. 11C shows the configuration when both the modular actuator joints 1110 and 1120, are in an actuated position and the insect foot 1130 is in contact with the ground. Subsequently, both the modular pneumatic actuator joints are brought back into their relaxed positions by deflating them in either a sequence or simultaneously. By first deflating the modular actuator joint 1120 then deflating 1110, forward movement is created. The body of the robot 1140 moves in the direction of the foot 1130 caused the entire crawling insect robot to be effectively displaced in the direction of the foot. Further, this restores the crawling insect robot to its condition shown in FIG. 11A and the cycle described in FIG. 11A through FIG. 11C can be repeated successively to attain displacement over large lengths.

Figure 12A:
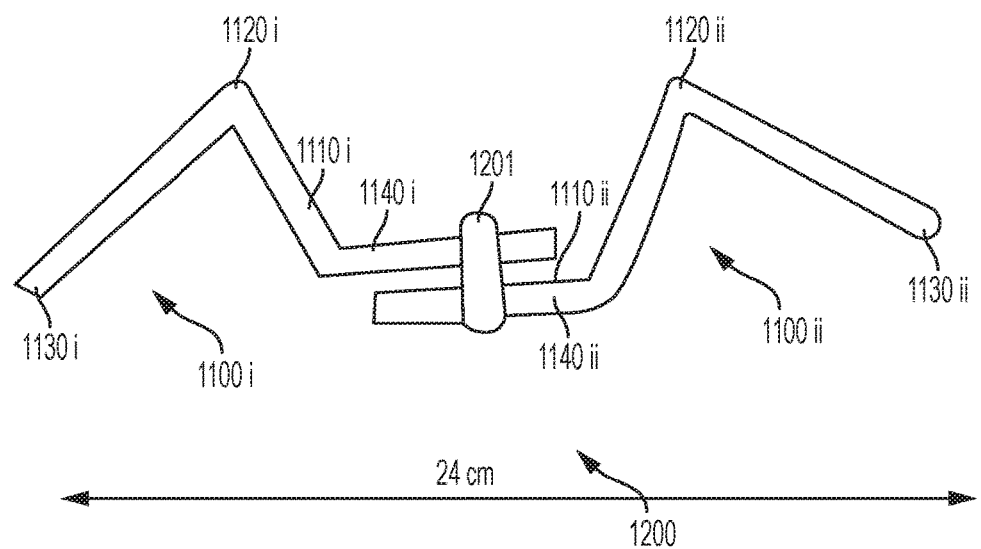
FIG. 12A shows another insect robot which couples two of the insect robots limbs and at the body with the foot pointing in opposite directions.
Figure 12B:
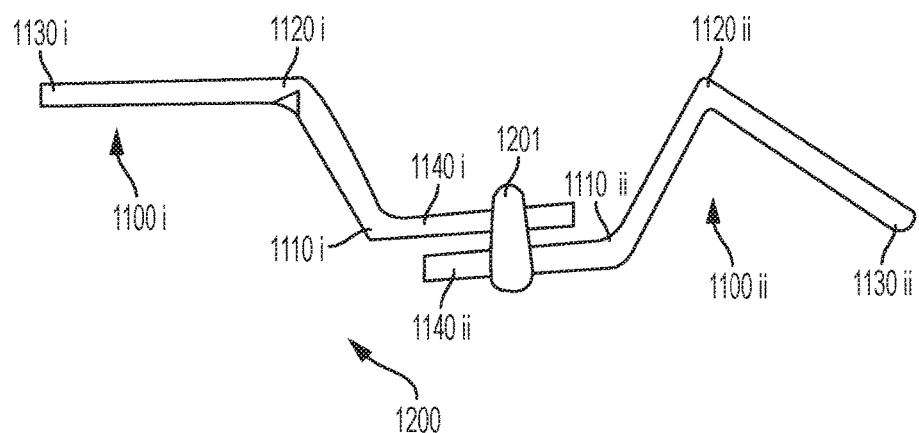
FIG. 12B shows an intermediate configurations for the insect robot during motion from the right to the left direction.
Figure 12C:
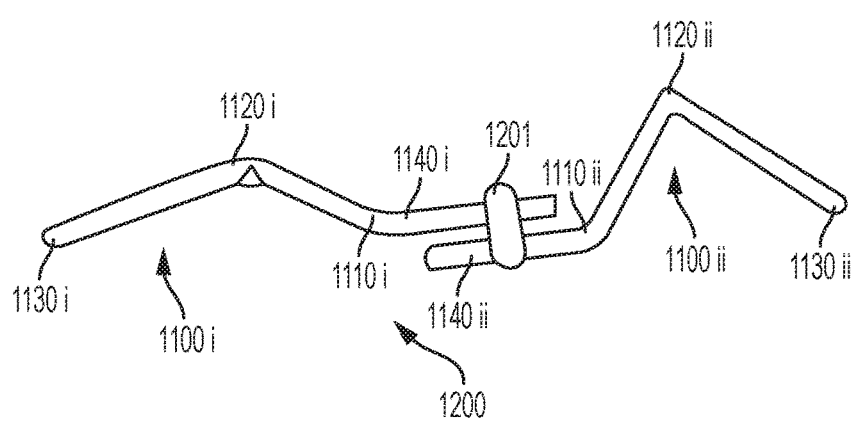
FIG. 12C shows a subsequent configurations for the insect robot during motion from the right to the left direction.

FIG. 12A shows another embodiment of an insect robot 1200 in which two of the insect robots 1100 *i* and 1100 *ii* are attached to each other at their respective bodies 1140 *i* and 1140 *ii* by a connecting device 1201, in such a way that their respective feet 1130 *i* and 1130 *ii* are pointing in opposite directions. This facilitates movement in two opposite directions. Actuating pneumatic actor 1120 *i* on the insect robot 1100 *i* and 1110 *ii* on insect robot 1100 *ii* result in the foot 1130 *i* of the insect robot 1100 *i* to be raised from the ground while the foot 1130 *ii* of the insect robot 1100 *ii* still remains in contact with the ground. This sequence of actuation causes the insect robot 1200 to be move in the direction of the foot 930 *i* due to the actuation of the pneumatic actuator 1110 *ii*. FIG. 12B shows this intermediate position. As a next step the pneumatic actuators 1110 *i* and 1120 *ii* are actuated resulting in all the four pneumatic actuators of the insect robot to be in actuated state. Since the foot 1130 *ii* is still in contact with the ground this causes the insect robot to further move forward in the direction of the foot 1130 *i* and the foot 1130 *i* returns to come in contact with the ground. In the next step the actuators 1120 *i* and 1110 *ii* are depressurized while 1110 *i* and 1120 *ii* are held in actuated position. This results in the foot 1130 *ii* to be raised up off the ground and the body section 1140 *i* and 1140 *ii* of the insect robot to slide further in the direction of the foot 1130 *i* This is shown in FIG. 12C. Finally, the actuators 1110 *i* and 1120 *ii* are depressurized and the insect robot is returned to its starting position. Additional cycles may be repeated to advance the insect robot further in the same direction. Motion in the opposite direction i.e., in the direction of insect robot 900 *ii*, can be attained by inverting the sequence of actuation and depressurization of the actuators.

Figure 13A:
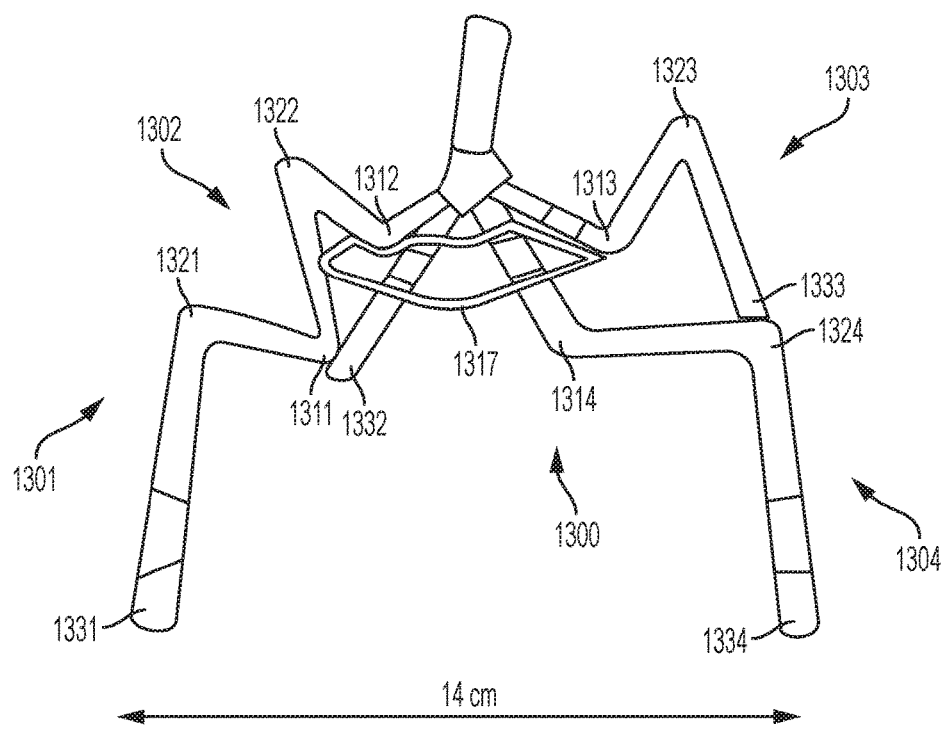
FIG. 13A shows another embodiment of an insect robot which comprises of four robot limbs.

FIG. 13A shows another embodiment of an insect robot 1300 which comprises of four insect robot limbs 1301, 1302, 1303 and 1304, each having a foot in contact with the ground. Thus, 1301 is in contact with the ground on foot 1331, 1302 is in contact with the ground on foot 1332, 1303 is in contact with the ground on foot 1333, and 1304 is in contact with the ground on foot 1334. In some embodiments the foot has a friction enhancing material disposed on it. Further, each limb comprises of two modular pneumatic actuator joints. Thus, 1101 comprises, two modular pneumatic actuator joints 1311 and 1321, 1302 comprises, two modular pneumatic actuator joints 1312 and 1322, 1303 comprises, two modular pneumatic actuator joints 1313 and 1323, and 1304 comprises, two modular pneumatic actuator joints 1314 and 1324. The four insect limbs 1301, 1302, 1303 and 1304 are further held together beyond the modular pneumatic actuator joints 1311, 1312, 1313 and 1314 with a rigid bracket 1317.

Figure 13B:
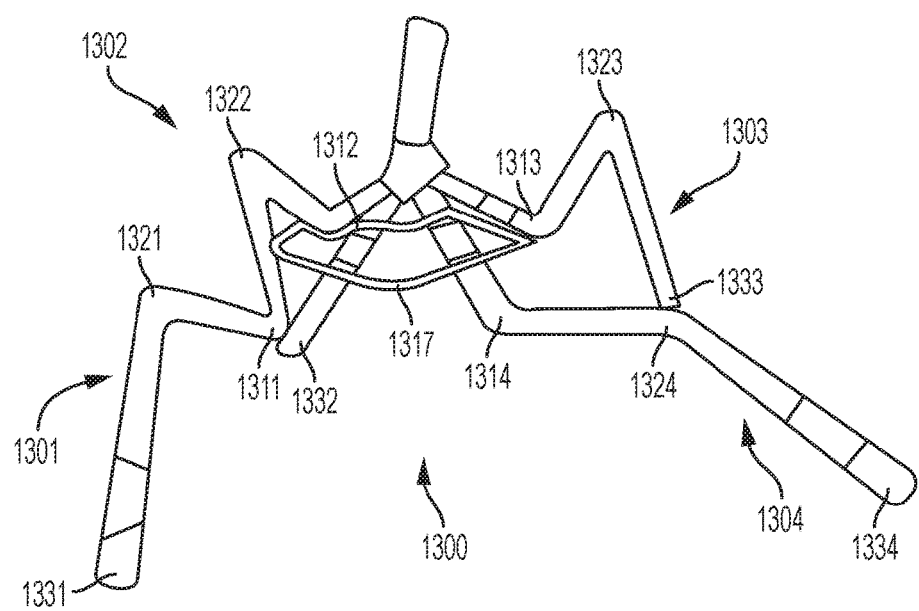
FIG. 13B shows that the condition of the insect robot that causes the foot to be elevated from the ground to cause a motion in the direction of the insect robot limb
Figure 13C:
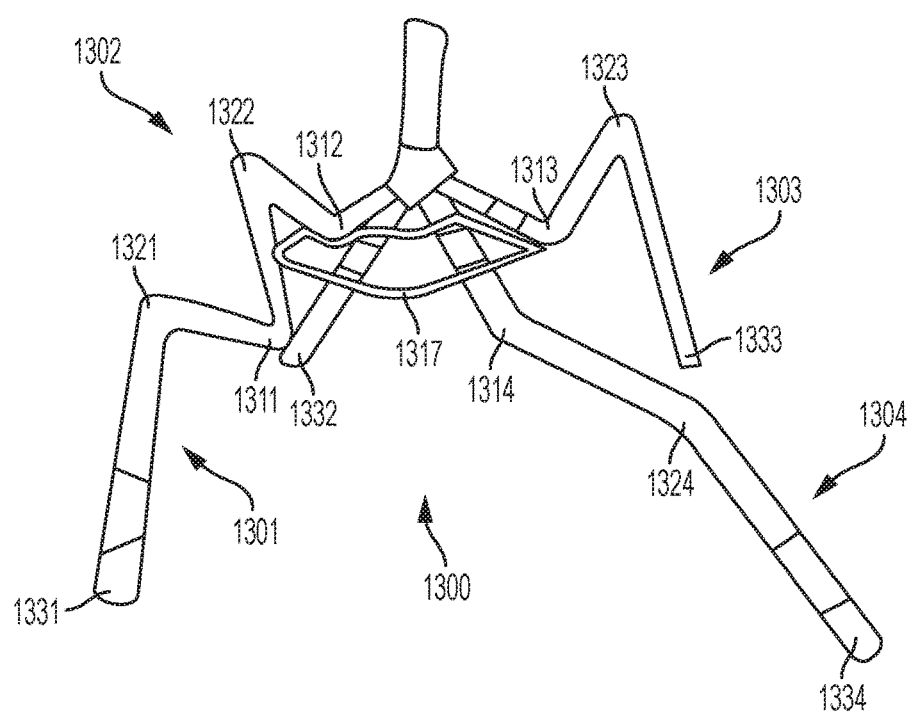
FIG. 13C shows the insect robot limb in a stretched out condition with the foot extended and in contact with the ground.

The insect robot 1300 provides a range of movement in four directions depending on the predetermined sequence of actuating of the modular pneumatic actuators. In one sequence to move the insect robot 1300 from a resting position, where all the modular pneumatic actuator joints are in a resting position, in the direction of insect robot limb 1304 the modular pneumatic actuator joints 1312, 1322, 1314 and 1324 are actuated in a predetermined sequence. This sequence is carried out by first actuating the modular pneumatic actuator joint 1324 which is located closer to foot 1334, and the pneumatic actuator joint 1312, on the insect robot limb 302, simultaneously, while keeping the other modular pneumatic actuators in resting position. FIG. 13B shows the resulting configuration where the insect foot 1334 is elevated from the ground. Subsequently, modular pneumatic actuator joints 1314 and 1322 are pressurized. This causes the insect robot limb 1304 to be stretched out and the foot 1334 to return in contact with the ground. After this step, modular pneumatic actuator joints 1312 and 1322 are sequentially depressurized to a relaxed position. FIG. 13C shows the resulting position. Other actuation sequences can be used to accomplish different ranges and types of motion.

Figure 14:
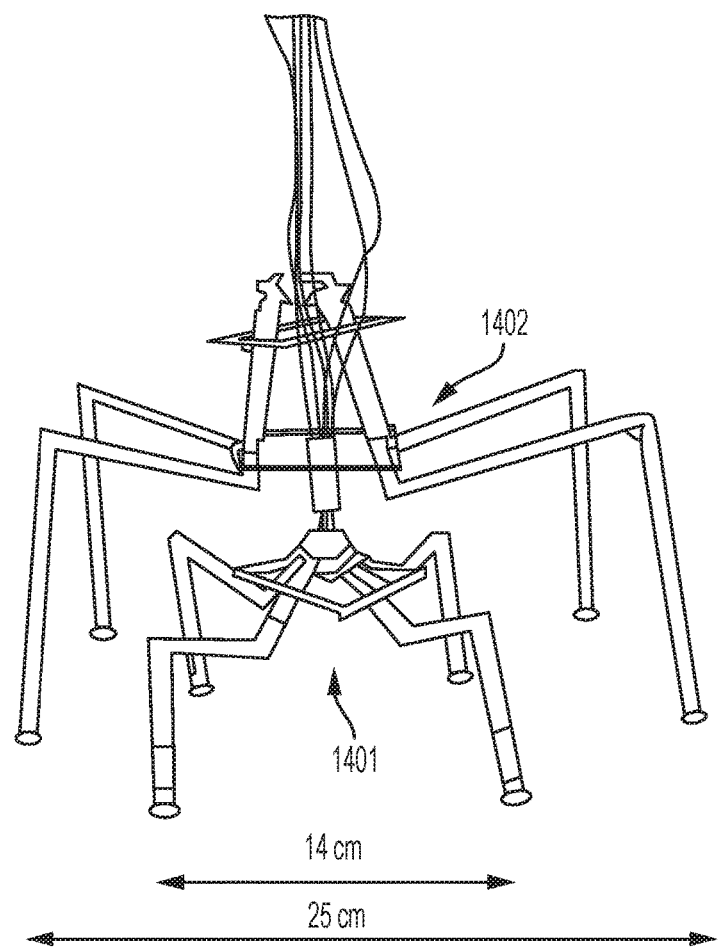
FIG. 14 shows two embodiments of the insect demonstrating that the insect robot can be scaled to larger sizes.

FIG. 14 shows two embodiments of the insect demonstrating that the insect robot can be scaled to larger sizes. 1401 is a four legged insect robot, similar to one discussed in FIG. 13 with a foot span of 14 cm. 1402 is a scaled up version of the same robot with a foot spacing of 25 cm. This is attained either by elongating the first and second hollow structures that make up the modular pneumatic actuator joint and connecting them directly, or by using larger sizes of intermediate connecting hollow structures to connect the pneumatic actuator joints.

Figure 15:
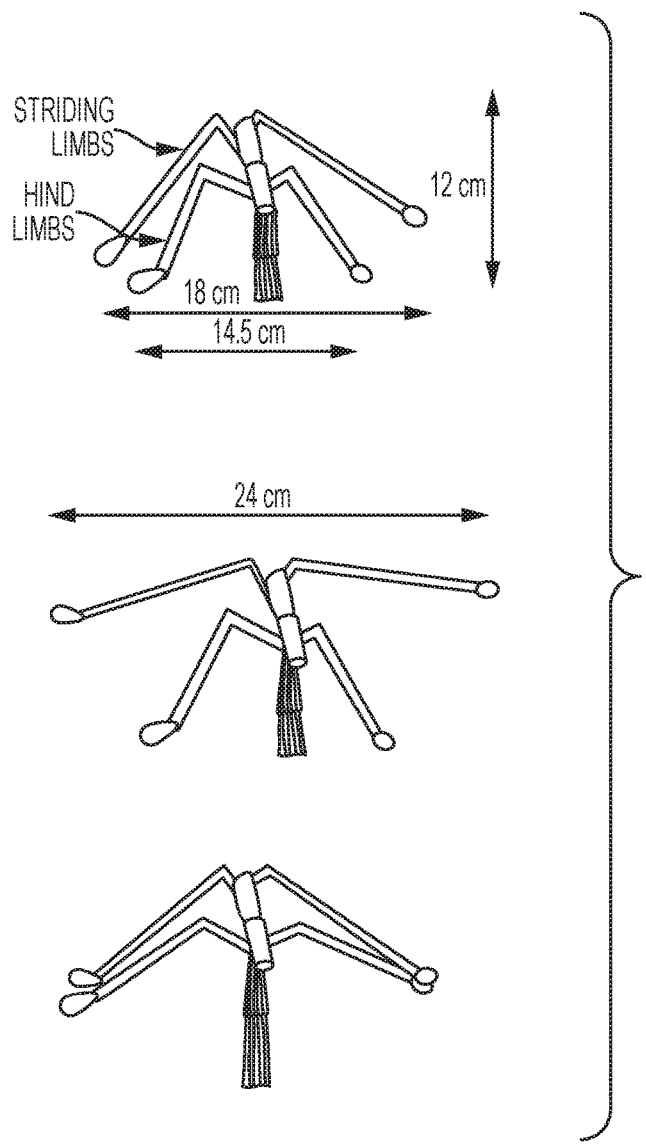
FIG. 15 shows an embodiment of the insect robot with four insect robot limbs that is able to mimic the gait of a water strider by traversing across the water surface while remaining afloat.

In some embodiments, the weight of the final insect robot is controlled through the choice of the materials selected in its fabrication. For example, the insect robots can be made from lightweight materials so that it can remain afloat on the surface of liquid such as water by relying on the surface tension and buoyancy from the liquid. In one or more embodiments, the feet of the robot can be modified to assist in flotation or paddling in the liquid. FIG. 15 shows an embodiment of an insect robot with four insect robot limbs that is able to mimic the gait of a water strider and remain afloat the water surface and traverse across it.

Figure 16A:
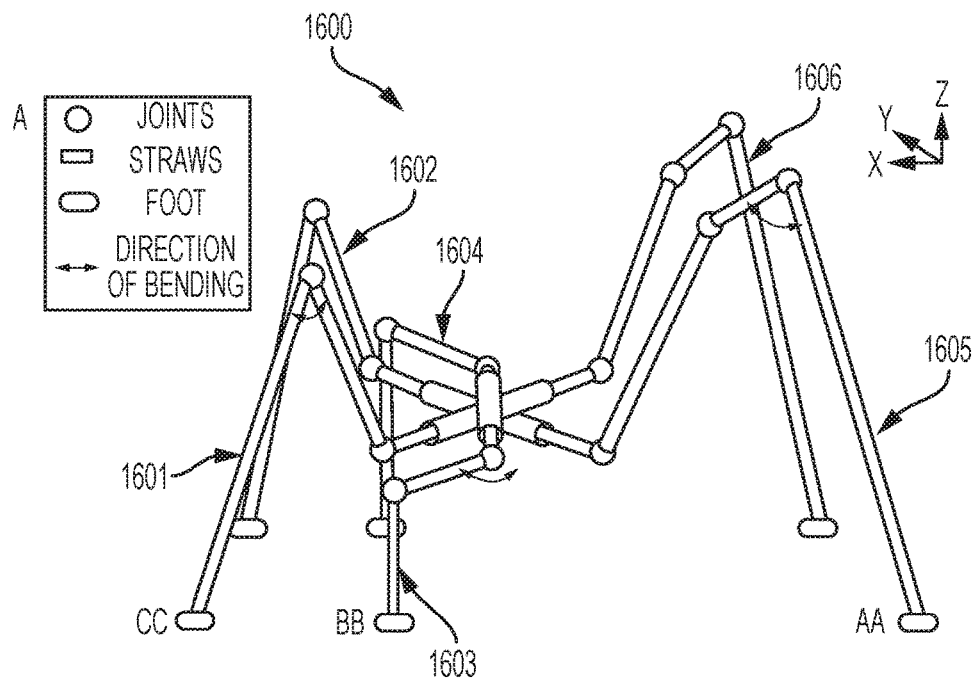
FIG. 16A shows a sketch of an embodiment of the insect robot with six robot limbs wherein four limbs have two pneumatic actuator joints and each and two limbs have three pneumatic actuator joints.
Figure 16B:
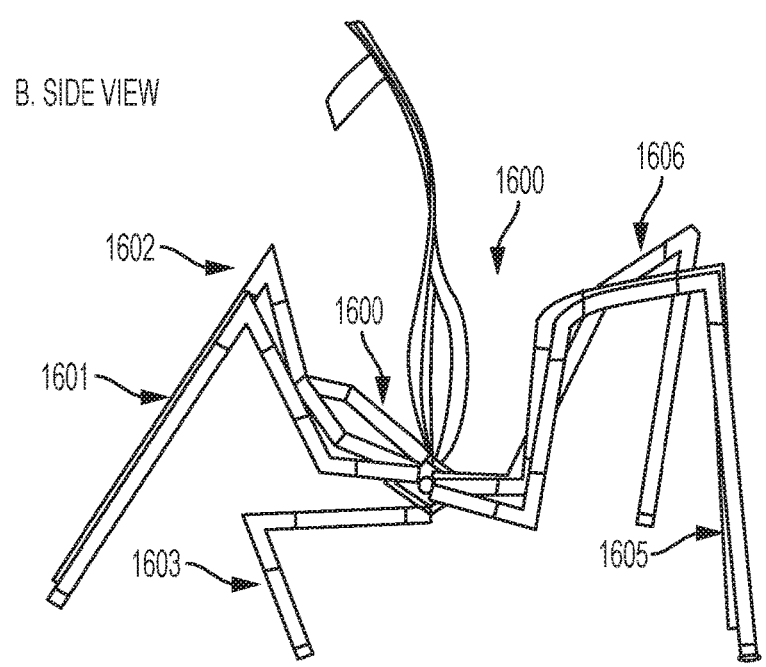
FIG. 16B shows the side view of an embodiment of the insect robot according to FIG. 16A.
Figure 16C:
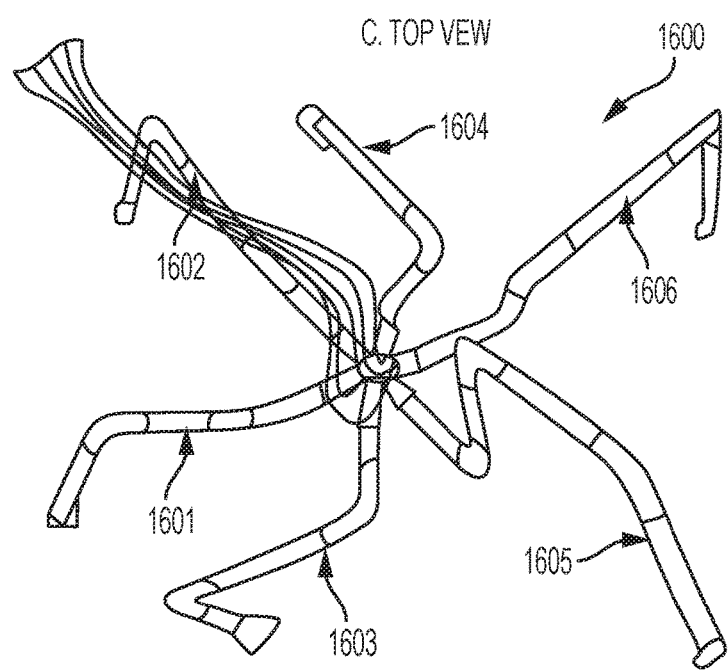
FIG. 16C shows the top view of an embodiment of the insect robot according to FIG. 16A.

FIG. 16A shows an embodiment of an insect robot 1400 with six pneumatic robot limbs, of which four limbs 1601, 1602, 1603, and 1604, have two pneumatic actuators where as two limbs 1605 and 1606, have three pneumatic actuators. FIG. 16B shows the side view of the insect robot 1600 and FIG. 16C shows the top view.

Figure 17A:
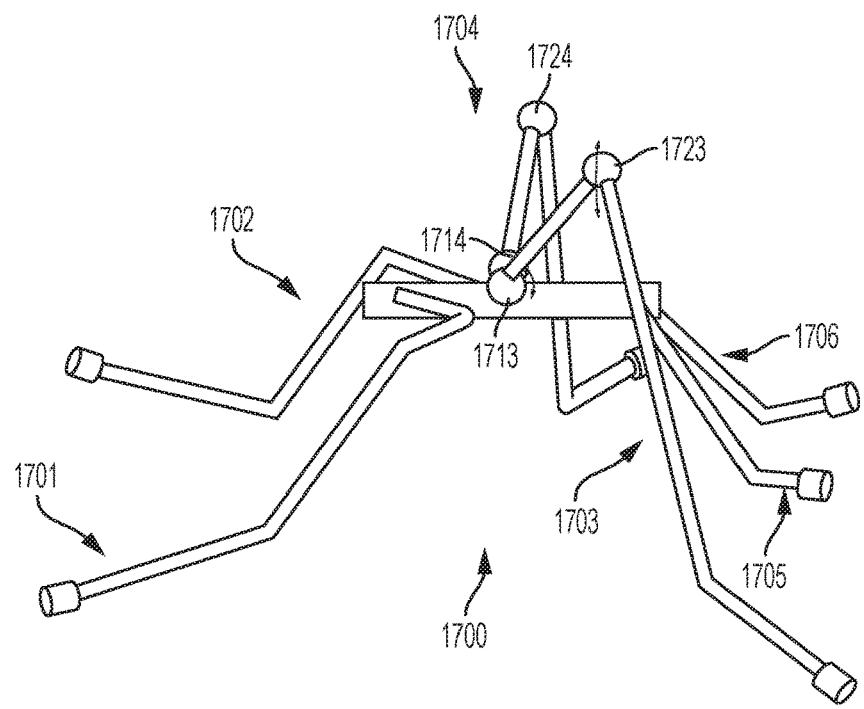
FIG. 17A shows an embodiment of the insect robot with six insect robot limbs that is able to mimic the gait of a water strider by traversing across the water surface while remaining afloat.
Figure 17B:
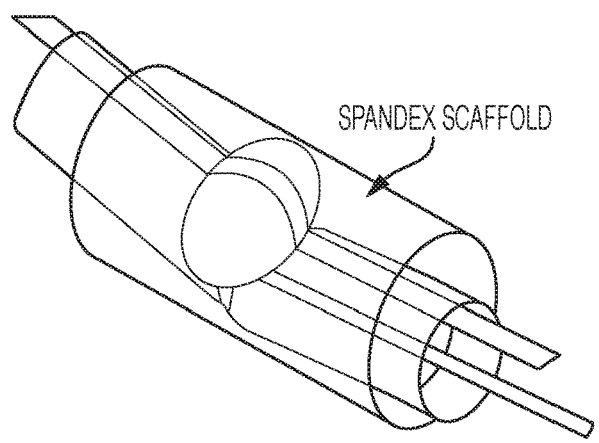
FIG. 17B shows an embodiment of a modular pneumatic actuator joint with fabric reinforcement.

FIG. 17A shows an embodiment of an insect robot with six insect robot limbs 1701, 1702, 1703, 1704, 1705 and 1706 that is able to mimic the gait of a water strider and remain afloat the water surface and traverse it. In an embodiment, only the two middle insect robot limbs 1703 and 1704 have pneumatic actuator joints. Pneumatic actuator joints 1713, 1723 are located on the insect robot limb 1703 and the pneumatic actuator joints 1714 and 1724 are located on the insect robot limb 1704 present in them that provide a bending motion. In some embodiments the pneumatic actuator joints are reinforced with a fabric to provide additional support. In yet another embodiment, the fabric of the material used is stretchable such as spandex. FIG. 17B which shows a pneumatic actuator joint reinforced with spandex fabric.

Figure 17C:
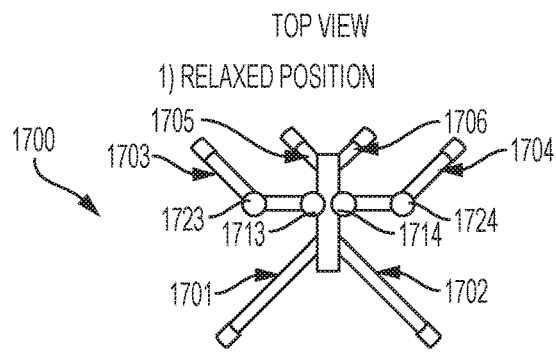
FIGS. 17C, 17D, 17E and 17F show the top view of the four successive stages of motion of an embodiment on an insect robot with size insect robot limbs that is able to mimic the gait of a water strider by traversing across the water surface while remaining afloat.
Figure 17D:
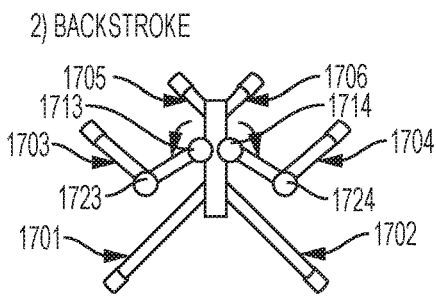
Figure 17E:
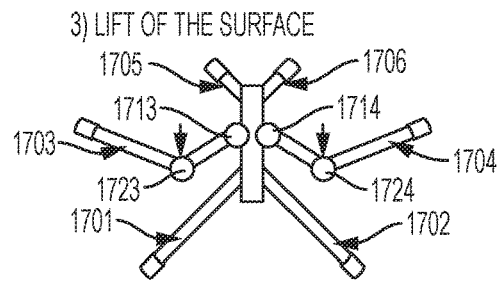
Figure 17F:
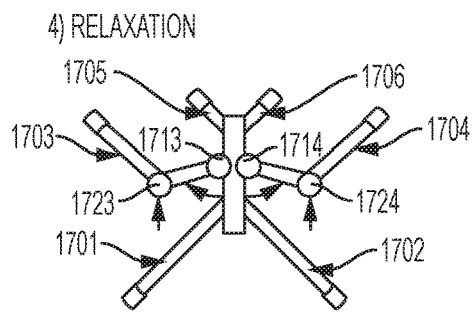
Figure 17G:
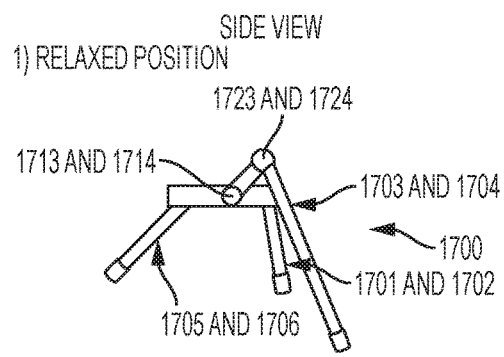
FIGS. 17G, 17H, 17I and 17J show the side view of the four successive stages of motion of an embodiment on an insect robot with size insect robot limbs that is able to mimic the gait of a water strider by traversing across the water surface while remaining afloat.
Figure 17H:
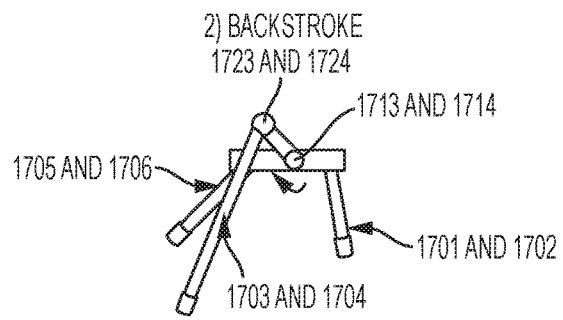
Figure 17I:
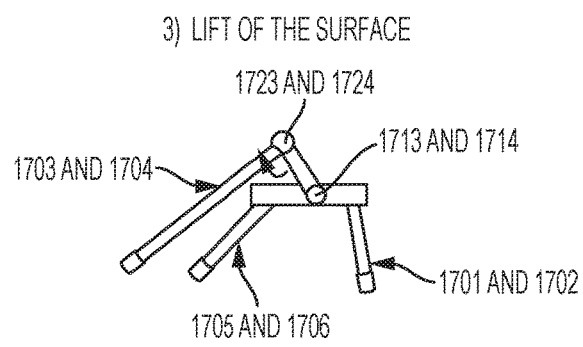
Figure 17J:
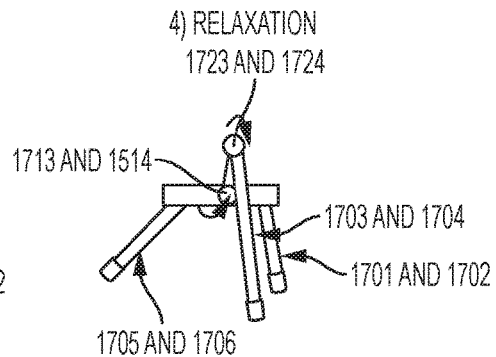

FIGS. 17C through 17F and 17G through 17J show the top view and side view, respectively of the four steps in chronological order required for moving the water strider shown in FIG. 17A forward. FIGS. 17C and 17G show the initial relaxed position. In FIGS. 17D and 17H the pneumatic actuator joints 1713 and 1714 are actuated to initiate a backstroke causing the insect robot limbs 1703 and 1704 to move backward. Subsequently, the pneumatic actuator joints 1723 and 1724 are actuated to cause the feet 1733 and 1734 to be raised from the surface of the liquid. In this situation the insect robot 1700 is afloat the surface of the liquid on feet 1731, 1732, 1735 and 1736. In the next step the pneumatic actuators 1713, 1714 and 1723 and 1724 are depressurized to return to relaxed state to complete a cycle for advancing the insect robot 1700 in the direction from right to left according to the side view images FIGS. 17G through 17J.

The insect robot 1700 as shown in FIG. 17A can be rotated by keeping all the insect robot limbs stationary while moving only one limb. For instance, keeping limbs 1701, 1702, 1703, 1705 and 1706 in a stationary position and actuating the pneumatic actuator joints 1714 and 1724 in a predetermined sequence can cause the insect robot 1700 to turn in either directions.

In some embodiments the gas used for inflating the bladder is compressed air. In yet another embodiment, the gas used for inflating the bladders of the modular pneumatic actuator joints is supplied by a cylinder or portable air compressor that is housed on the insect robot In some embodiments, the pressure source coupled to the modular pneumatic actuator joint can be controlled using software running on a computational device. The software needed for implementing the control process includes a high level procedural or an object-orientated language such as MATLAB, C, C++, Java or Perl. The software may also be implemented in assembly language if desired. In certain embodiments, the software is stored on a storage medium or device such as read only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the insect robot is fabricated using low cost materials that are readily available significantly reducing the cost of the device. In a one or more embodiments, the hollow structures of the robot could be fabricated with PVC pipes, the restraining membrane could be made using rubber from a tire tube, rubber pipes could be used for the connective tubing and the inflatable bladder could also be made of rubber from a tire tube which is heat pressed and sealed to facilitate inflation in a preferential direction.

The insect based robot can be used for a variety of applications. Specifically, since the robot can be fabricated in a cost effective way, it can be deployed for functioning where retrieval after completion of the operation is not feasible. For example, in areas of hazardous waste and hostile environmental conditions not suitable for access by human beings.

Although the present disclosure has been described and illustrated in the foregoing example embodiments, it is understood that the present disclosure has been made only by way of example, and that numerous changes in the details of the implementation of the disclosure may be made without departing from the spirit and scope of the disclosure, which are limited only be the claims which follow. Other embodiments are with the following claims.

What is claimed is:

1. A modular pneumatic robotic actuator, comprising:
a first elongated rigid structure and a second elongated rigid structure connected to each other at a moveable joint,
wherein the movable joint is disposed at a first angle when the moveable joint is unactuated and a second angle when the moveable joint is actuated; and
a restraining membrane comprised of an elastomeric material connecting the first and second rigid structures, wherein the restraining membrane is not stretched in the unactuated state and at least a portion of the restraining member is stretched in in the actuated state, and wherein the portion of the restraining membrane that is stretched provides a restoring force to the actuator to return the movable joint to the first angle.

2. The actuator according to claim 1, wherein the restraining membrane is attached to the first and second rigid structures by an adhesive.

3. The actuator according to claim 1, wherein the restraining membrane is attached to the first and second rigid structures by a rope or string.

4. The actuator according to claim 1, wherein the first and second rigid structures have hooks and the restraining membrane is attached to the hooks of the first and second rigid structures.

5. The actuator according to claim 1, wherein the first and second rigid structure is made of a material selected from the group consisting of aluminum, copper, brass, polypropylene, poly(vinyl chloride), polycarbonate, poly(tetrafluoroethylene), polyisobutylene, polystyrene, polyacrylonitrile, poly(methyl acrylate), poly(methyl methacrylate), polybutadiene, polychloroprene, poly(cis-1, 4-isopren), and poly(trans-1,4-isoprene).

6. The actuator according to claim 1, wherein the restraining membrane is made of an elastomeric material selected from the group consisting of polyisoprene, polybutadiene, polyurethane, polychloroprene, butyl rubber, halogenated butyl rubber, styrene-butadiene rubber, nitrile rubber, hydrogenated nitrile rubber, ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, and polysulfide rubber.

7. The actuator according to claim 1, wherein the joint comprises a web of material that is integral to the first and second rigid structures.

8. The actuator according to claim 1, wherein the joint is a thinned strip of the same material used for the first and second rigid structures.

9. The actuator according to claim 1, wherein the joint is a thinned strip of a material different than that used for the first and second rigid structures.

10. The actuator according to claim 1, wherein the joint is a pin provided at the point where the first and second rigid structures meet.

11. The actuator according to claim 1, wherein the joint is a ring that passes through a hole located at the end of the first and second rigid structures where the two rigid structures are connected.

12. The actuator according to claim 1, wherein the joint is a hinge.

13. The actuator according to claim 1, wherein the joint comprises a notch cut into the first and second rigid structures to introduce tapered edges that meet in the unactuated state and that separate in the actuated state.

14. The actuator of claim 1 wherein an inflatable bladder is disposed between the joint and the restraining membrane.

15. The actuator according to claim 14, wherein the inflatable bladder, the restraining membrane, and a substantial part of the first and second rigid structures are covered by a fabric material.

16. A method of actuating a modular pneumatic robot actuator comprising:
pressurizing an inflatable bladder with a gas to inflate the bladder,
wherein the modular robotic actuator comprises:
a first elongated rigid structure and a second elongated rigid structure connected to each other at a moveable joint,
wherein the movable joint is disposed at a first angle when the moveable joint is unactuated and a second angle when the moveable joint is actuated; and
a restraining membrane comprised of an elastomeric material connecting the first and second rigid structures, wherein the restraining membrane is not stretched in the unactuated state and at least a portion of the restraining member is stretched in the actuated state, and wherein the restraining membrane that is stretched provides a restoring force to the actuator to return the movable joint to the first angle,
wherein the inflatable bladder is disposed between the joint and the restraining membrane,
wherein the inflatable bladder exerts a force on the restraining membrane causing the moveable joint to open.

17. The method of claim 16 further comprising:
depressurizing the inflatable bladder to deflate the bladder wherein the force exerted on the restraining membrane is thereby removed and the restraining membrane causes the moveable joint to close.

* * * * *